(12) United States Patent
Matsuki et al.

(10) Patent No.: US 9,778,454 B2
(45) Date of Patent: Oct. 3, 2017

(54) LIGHT ADJUSTING APPARATUS

(71) Applicant: OLYMPUS CORPORATION, Tokyo (JP)

(72) Inventors: Kaoru Matsuki, Kawasaki (JP); Takeshi Suga, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 215 days.

(21) Appl. No.: 14/706,174

(22) Filed: May 7, 2015

(65) Prior Publication Data

US 2015/0234175 A1    Aug. 20, 2015

Related U.S. Application Data

(63) Continuation of application No. PCT/JP2013/066682, filed on Jun. 18, 2013.

(30) Foreign Application Priority Data

Nov. 12, 2012  (JP) .................. 2012-248675

(51) Int. Cl.
*G02B 7/02* (2006.01)
*G02B 26/02* (2006.01)
(Continued)

(52) U.S. Cl.
CPC ............... *G02B 26/00* (2013.01); *G02B 7/04* (2013.01); *G02B 7/16* (2013.01); *G03B 9/02* (2013.01)

(58) Field of Classification Search
CPC .... G11B 7/0935; G02B 5/005; G02B 23/125; G02B 7/04; G02B 26/007; G02B 26/02;
(Continued)

(56) References Cited

U.S. PATENT DOCUMENTS 4,412,144 A    10/1983  Denisov et al.
2009/0003824 A1    1/2009  Yasunaga
(Continued)

FOREIGN PATENT DOCUMENTS

FR    2 503 952 A1    10/1982
JP    H09-022042 A    1/1997
(Continued)

OTHER PUBLICATIONS

International Search Report dated Sep. 17, 2013 issued in PCT/JP2013/066682.
Extended Supplementary European Search Report dated Jun. 1, 2016 in related European Application No. 13 85 3547.1.

*Primary Examiner* — Dawayne A Pinkney
(74) *Attorney, Agent, or Firm* — Scully, Scott, Murphy & Presser, P.C.

(57) ABSTRACT

A light adjusting apparatus including a drive section provided with an axial magnet, a coil core member and a coil, a first substrate provided an opening and a first cut-out portion, a second substrate provided with an opening and a second cut-out portion, located at a predetermined distance from the first substrate, an incident light adjusting section to which the axial magnet is joined, and an axial magnet support member provided with a distance keeping portion that keeps a distance between the coil core member and the axial magnet to within a certain range and a dropout prevention portion that prevents dropout of the axial magnet from the first cut-out portion, the axial magnet support member being fixed to the coil core member, in which the incident light adjusting section is rotated by the drive section for adjusting the incident light.

9 Claims, 14 Drawing Sheets

(51) Int. Cl.
*G02B 9/00* (2006.01)
*G02B 5/22* (2006.01)
*G02B 26/00* (2006.01)
*G02B 7/04* (2006.01)
*G02B 7/16* (2006.01)
*G03B 9/02* (2006.01)

(58) Field of Classification Search
CPC ........ G02B 13/00; G02B 15/10; G02B 15/08;
G02B 3/00; G02B 7/021; G02B 7/02;
G02B 7/023; G02B 5/223
USPC ....... 359/814, 738–739, 815, 829, 889, 230,
359/233–234, 236, 740, 672–675,
359/722–723, 811, 819, 822–823, 885,
359/227, 232, 229
See application file for complete search history.

(56) References Cited

U.S. PATENT DOCUMENTS

| | | | |
|---|---|---|---|
| 2011/0032592 A1 | 2/2011 | Okita | |
| 2011/0085223 A1* | 4/2011 | Ide | G03B 9/02 359/233 |
| 2011/0267669 A1* | 11/2011 | Ide | G02B 5/005 359/233 |

FOREIGN PATENT DOCUMENTS

| | | |
|---|---|---|
| JP | 2007-060730 A | 3/2007 |
| JP | 2009-008719 A | 1/2009 |
| JP | 2010-186168 A | 8/2010 |
| JP | 2011-033910 A | 2/2011 |

* cited by examiner

LIGHT ADJUSTING APPARATUS

CROSS REFERENCE TO RELATED APPLICATION

This application is a continuation application of PCT/JP2013/066682 filed on Jun. 18, 2013 and claims benefit of Japanese Application No. 2012-248675 filed in Japan on Nov. 12, 2012, the entire contents of which are incorporated herein by this reference.

BACKGROUND OF THE INVENTION

1. Field of the Invention

The present invention relates to a light adjusting apparatus that adjusts light by inserting/retracting an incident light adjusting section into/from an optical path of incident light.

2. Description of the Related Art

Image pickup devices having an image pickup function are widely used in a variety of fields, among which there is a field of small image pickup devices having a relatively small shape. Some examples of such a small image pickup device include an electronic endoscope, an optical microscope provided with an image pickup function, a portable device provided with an image pickup function or a micro video scope.

Since priority is given to miniaturization in conventional small image pickup devices, a fixed focus lens, a fixed aperture diaphragm, a fixed characteristic filter or the like are adopted as optical elements such as a lens, a diaphragm and an optical filter.

In contrast, high image quality has been also required for these small image pickup devices in recent years, and there is a growing demand for adopting a focus lens, a variable diaphragm, a variable characteristic filter or the like as optical elements of the aforementioned light adjusting apparatus, that is, a demand for functions as a light adjusting apparatus that adjusts light.

Thus, many techniques are being proposed which seek to reduce sizes of light adjusting apparatuses so as to be applicable to small image pickup devices.

For example, FIG. 1 or FIG. 2 of Japanese Patent Application Laid-Open Publication No. 9-22042 describes a configuration as shown in FIG. 24 attached to the Specification of the present application. Here, FIG. 24 is a plan view illustrating an example of a configuration of a conventional light adjusting apparatus.

A circular (more specifically, substantially C-shaped) coil core member (yoke) (103) wound with an excitation coil (104) is placed around a taking lens (102) fixed to a base plate (101). Furthermore, a permanent magnet (105) is placed in a cut-out portion of this substantially C-shaped coil core member (103) so that both core member ends (103a, 103b) of the coil core member (103) face the permanent magnet (105). By configuring a closed-magnetic circuit of an electromagnetic drive apparatus in this way, it is possible to increase the volume of the coil core member (103) around the taking lens (102) and obtain a sufficient drive force.

Furthermore, FIG. 1 or the like of Japanese Patent Application Laid-Open Publication No. 2010-186168 describes a configuration provided with a substantially C-shaped coil core member disposed on a substrate, a coil wound around this coil core member and an axial magnet disposed in a cut-out portion of the substantially C-shape, and a technique of providing a cut-out portion for receiving the axial magnet on a substrate and facilitating assembly of the axial magnet to the substrate. The above-described Publication describes the use of a separate bearing member (stopper portion) to prevent dropout of the axial magnet from the cut-out portion. Furthermore, FIG. 3, FIG. 9 and FIG. 10 of the Publication describe that a plurality of light adjusting means are arranged in the light adjusting apparatus.

The axial magnet is disposed at a certain distance from both core member ends of the coil core member so as to prevent interference to rotation thereof.

SUMMARY OF THE INVENTION

In order to attain the above object, a light adjusting apparatus according to an aspect of the present invention includes a drive section including an axial magnet magnetized so as to have different magnetic poles around an axis, a coil core member located in proximity to a side face of the axial magnet at a core member end and a coil wound around the coil core member, the drive section rotating the axial magnet by transmitting a magnetic force generated by passing a current through the coil to the axial magnet via the coil core member, a first substrate including a first light passage shaped portion for allowing incident light to pass therethrough and a first cut-out portion into which one end side of the axial magnet in an axial direction is inserted, on one side of which the coil and the coil core member are arranged, a second substrate disposed parallel to the first substrate at a predetermined distance so as to face the other side of the first substrate including a second light passage shaped portion for allowing incident light to pass therethrough and a second cut-out portion for inserting the other end side of the axial magnet in the axial direction, an incident light adjusting section to which the axial magnet is joined so as to rotate integrally therewith, disposed so as to rotate within the predetermined distance along with rotation of the axial magnet, and having a function of adjusting light, and an axial magnet support member including a distance keeping portion fixed to the core member end, sandwiched between the core member end and the axial magnet to keep a distance between the core member end and the axial magnet to within a certain range and a dropout prevention portion for preventing dropout of the axial magnet from the first cut-out portion, in which the incident light adjusting section is rotated by the drive section via the axial magnet to be displaced to a retracted position retracted from an optical path of the incident light that passes through the first light passage shaped portion and the second light passage shaped portion, and to an inserted position located in the optical path of the incident light to thereby adjust the incident light.

DETAILED DESCRIPTION OF THE PREFERRED EMBODIMENTS

Figure 1:
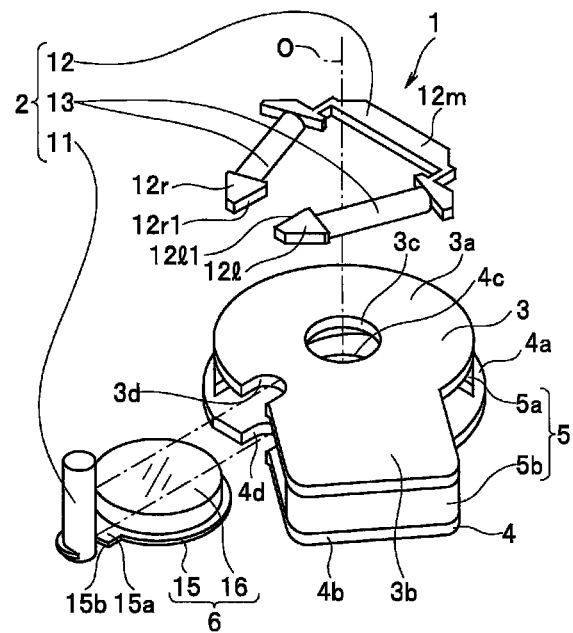
FIG. 1 is an exploded perspective view illustrating a basic configuration of a light adjusting apparatus relating each embodiment of the present invention.
Figure 2:
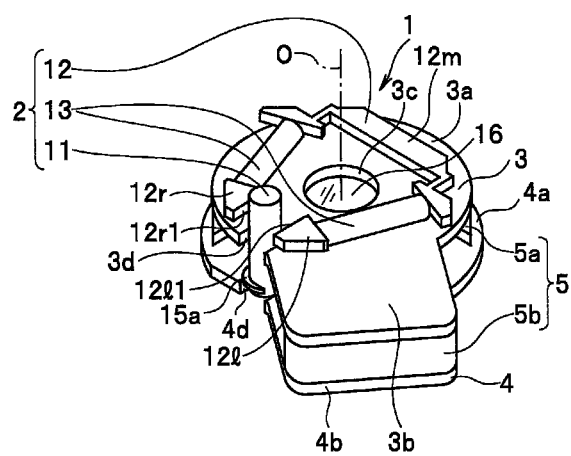
FIG. 2 is a perspective view illustrating a basic configuration of the light adjusting apparatus related to each embodiment of the present invention.
Figure 3:
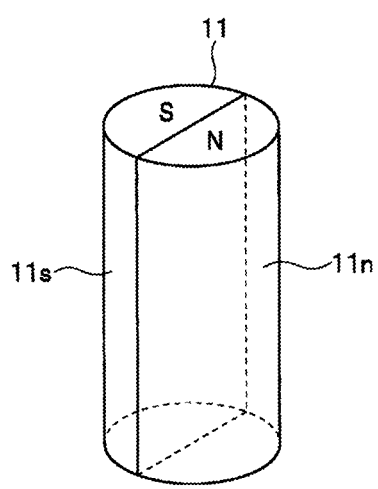
FIG. 3 is a perspective view illustrating a magnetic configuration of an axial magnet related to each embodiment of the present invention.
Figure 4:
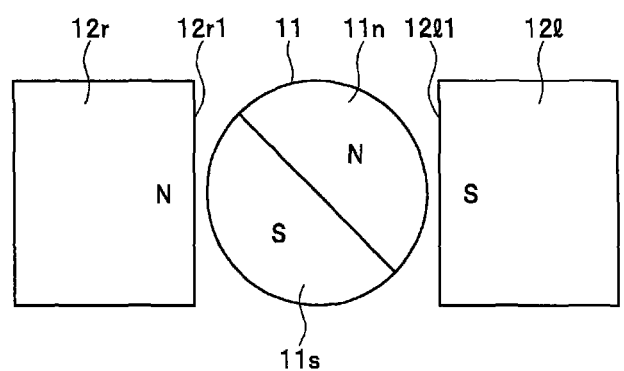
FIG. 4 is a diagram illustrating a situation of operation of a drive section related to each embodiment of the present invention.
Figure 5:
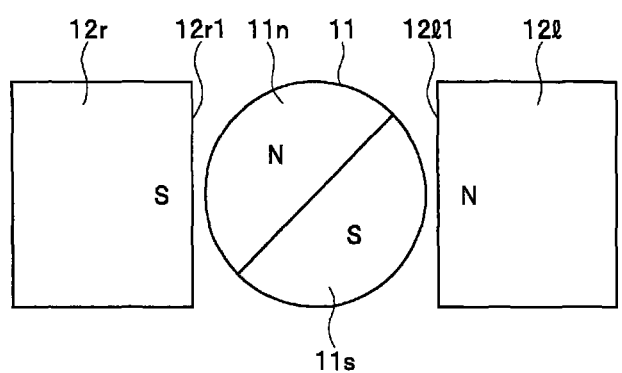
FIG. 5 is a diagram illustrating another situation of operation of the drive section related to each embodiment of the present invention.

First, a basic configuration of a light adjusting apparatus 1 related to each embodiment of the present invention will be described with reference to FIG. 1 to FIG. 5. FIG. 1 is an exploded perspective view illustrating a basic configuration of the light adjusting apparatus 1, FIG. 2 is a perspective view illustrating the basic configuration of the light adjusting apparatus 1, FIG. 3 is a perspective view illustrating a magnetic configuration of an axial magnet 11, FIG. 4 is a diagram illustrating a situation of operation of a drive section 2 and FIG. 5 is a diagram illustrating another situation of operation of the drive section 2.

The light adjusting apparatus 1 is intended to adjust incident light, and examples of "adjustment" referred to here include light quantity adjustment using a diaphragm and pupil adjustment, light quantity adjustment using an ND filter, condensing adjustment using lenses, polarization adjustment using a polarization filter, wavelength band adjustment using a color filter or a combination thereof, but the type of adjustment is not limited to these and any type of adjustment is widely applicable as long as it is optical adjustment.

Hereinafter, a case will be described as an example where light adjustment is adjustment using lenses.

The light adjusting apparatus 1 is provided with the drive section 2, a first substrate 3, a second substrate 4, a spacer 5, and an incident light adjusting section 6.

The drive section 2 includes the axial magnet 11 magnetized so as to have different magnetic poles around an axis, a coil core member 12 placed in proximity to a side face of the axial magnet 11 at an end of the core member and coils 13 wound around the coil core member 12, and the drive section 2 rotates the axial magnet 11 by transmitting a magnetic force generated by passing a current through the coils 13 to the axial magnet 11 via the coil core member 12.

The axial magnet 11 is a columnar axial member formed as a permanent magnet and arranged such that its axial direction becomes parallel to an optical axis O of a main optical system which is not shown. As shown in FIG. 3, this axial magnet 11 has, for example, a two-pole configuration, magnetized such that one semicircular column portion becomes an S pole 11s and the other semicircular column portion becomes an N pole 11n. The axial magnet 11 preferably has a columnar shape but is not limited to a columnar shape, and may have, for example, a polygonal columnar shape.

The coil core member 12 is formed of a magnetic body such as permalloy or silicon steel into an open curved shape (that is, a partially cut closed curved line) and is formed into a substantially triangular shape in the example shown in FIG. 1 including a rectilinear right arm portion 12r wound with a coil 13, a rectilinear left arm portion 12l wound with a coil 13 and a rectilinear coupling portion 12m that couples the right arm portion 12r and the left arm portion 12l. A distal end face 12r1 of the right arm portion 12r and a distal end face 12l1 of the left arm portion 12l constitute a pair of core end faces that sandwich both sides of the axial magnet 11 (both sides of a circumferential surface of the axial magnet 11 because the axial magnet 11 in the example shown in the drawing has a columnar shape). By this means, the coil core member 12 and the axial magnet 11 construct a closed magnetic circuit to transmit magnetism generated by the coils 13. An example where the closed curve has a substantially triangular shape has been shown above, but it goes without saying that the closed curve is not limited to the triangular shape.

The first substrate 3 and the second substrate 4 are each constructed of a disk portion 3a, 4a integrated with a square-shaped proximal end portion 3b, 4b.

The first substrate 3 includes an opening 3c which is a first light passage shaped portion to allow incident light to pass therethrough and a first cut-out portion 3d into which one end side of the axial magnet 11 in the axial direction is inserted, on one side of which the coils 13 and the coil core member 12 are arranged.

The second substrate 4 is disposed so as to face the other side of the first substrate 3, parallel to the first substrate 3 at a predetermined distance and includes an opening 4c which is a second light passage shaped portion to allow incident light to pass therethrough and a second cut-out portion 4d into which the other end side of the axial magnet 11 in the axial direction is inserted.

The first light passage shaped portion and the second light passage shaped portion constitute, for example, the circular openings 3c and 4c formed at centers of the disk portions 3a and 4a, and an optical axis O of a main optical system which is not shown passes through the centers of the openings 3c and 4c perpendicular to the substrate surfaces of the first substrate 3 and the second substrate 4. Note that the opening 3c or the opening 4c may also be an optical opening that functions as an aperture diaphragm in an overall optical system (an overall optical system including a main optical system which is not shown and a lens 16 which will be described later).

It would be sufficient if the first light passage shaped portion and the second light passage shaped portion had at least shapes that do not interrupt traveling of incident light in the optical axis O direction incident from the main optical system which is not shown, and therefore these parts need not always be circular openings, but may also be polygonal openings. Moreover, these parts even need not be openings but may also be, for example, U-shaped cut-out portions or square cut-out portions.

The first cut-out portion 3d and the second cut-out portion 4d allow one end side and the other end side of the axial magnet 11 to be inserted in a direction crossing the optical axis O (direction perpendicular to the optical axis O as a specific example) and pivotably support the axial magnet 11 as required. Note that the expression "pivotably support the axial magnet 11 as required" is used here because in some of the embodiments which will be described hereinafter, the axial magnet 11 is pivotably supported by at least one of the first cut-out portion 3d and the second cut-out portion 4d, whereas in some other embodiments, the axial magnet 11 need not be pivotably supported by either the first cut-out portion 3d or the second cut-out portion 4d.

In the example shown in FIG. 1 and FIG. 2, the first cut-out portion 3d and the second cut-out portion 4d are formed as U-shaped cut-out portions and are provided in the vicinity of the proximal end portions 3b and 4b in the perimeters of the disk portions 3a and 4a such that their respective positions within a plane perpendicular to the optical axis O are aligned with each other. This is because the axial direction of the axial magnet 11 inserted in the first cut-out portion 3d and the second cut-out portion 4d is parallel to the optical axis O direction as described above.

The spacer 5 is intended to define a predetermined distance between the aforementioned first substrate 3 and second substrate 4. This spacer 5 is configured by including an arc-shaped distal end spacer 5a sandwiched between the disk portions 3a and 4a of the first substrate 3 and the second substrate 4 along a distal end side circumferential direction, and a proximal end spacer 5b sandwiched between the proximal end portions 3b and 4b of the first substrate 3 and the second substrate 4.

The incident light adjusting section 6 is provided with a light adjusting function, to which the aforementioned axial magnet 11 is joined so as to rotate integrally therewith, disposed so as to rotate along with the rotation of the axial magnet 11 within a predetermined distance defined by the spacer 5 between the first substrate 3 and the second substrate 4. In this example, the incident light adjusting section 6 is constructed with a lens 16 attached to a ring-shaped lens frame 15. Here the lens 16 is an optical element which is inserted in the optical path of the aforementioned main optical system which is not shown, for changing a focal length or a focus position or the like of the main optical system.

The lens frame 15 includes a holding portion 15a that protrudes from part of a rim thereof, the axial magnet 11 engages with a cut-out portion 15b provided in this holding portion 15a and is further joined thereto using an adhesive or the like so as to rotate integrally therewith. Here, the cut-out portion 15b is, for example, a U-shaped cut-out portion and the axial magnet 11 can be attached thereto from a direction perpendicular to the optical axis O.

With such a configuration, the light adjusting apparatus 1 rotates the incident light adjusting section 6 by the drive section 2 via the axial magnet 11 to displace the incident light adjusting section 6 to a retracted position retracted from an optical path of incident light that passes through the openings 3c and 4c, and to an inserted position located in the optical path of the incident light to thereby adjust the incident light.

That is, as shown in FIG. 4 and FIG. 5, when a current in one direction is passed through the coils 13, one of the distal end face 12r1 of the right arm portion 12r and the distal end face 12l1 of the left arm portion 12l is magnetized to an S-pole and the other is magnetized to an N-pole, whereas when a current in the other direction is passed through the coils 13, the poles magnetized are inverted. The axial magnet 11 rotates toward a minimum point of a magnetic field potential which is generated through magnetic interaction between a magnetic pole of itself and a magnetic field generated by the coils 13. When the axial magnet 11 has a two-pole configuration, the positions of the minimum points of the magnetic field potential formed are, for example, 180° opposite to each other between the aforementioned current in one direction and current in the other direction. However, the rotation range of the axial magnet 11 and the incident light adjusting section 6 is regulated by a stopper or the like which is not shown that defines the inserted position and the retracted position to within a range of a predetermined angle smaller than 180°. Therefore, the incident light adjusting section 6 moves to the inserted position when a current in one direction is applied to the coils 13 and moves to the retracted position when a current in the other direction is applied to the coils 13.

Figure 9:
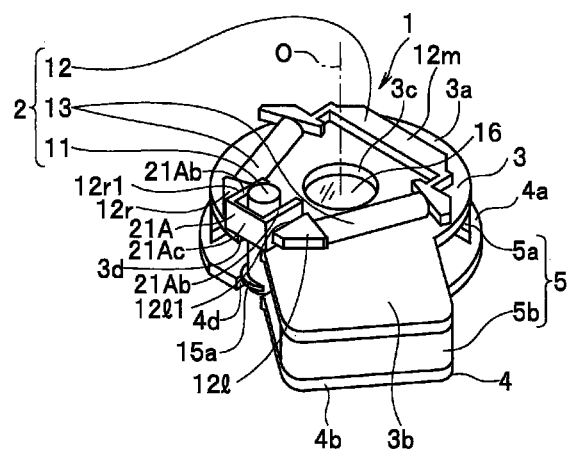
FIG. 9 is a perspective view illustrating a configuration of a light adjusting apparatus according to a first modification of Embodiment 1 of the present invention.
Figure 10:
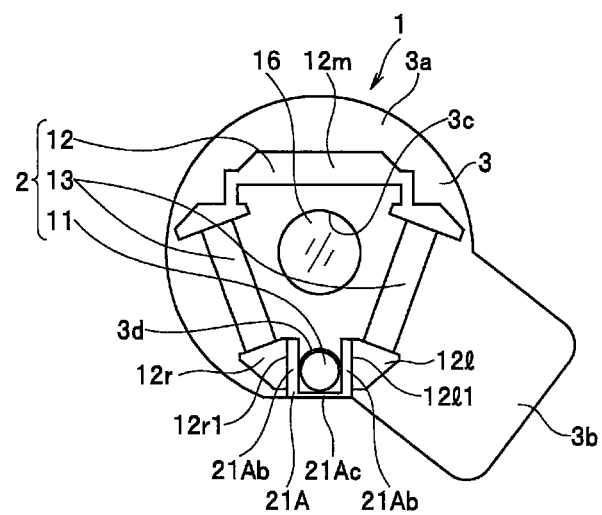
FIG. 10 is a plan view illustrating the configuration of the light adjusting apparatus according to the first modification of Embodiment 1 of the present invention.

Note that although a case has been described here for simplicity where one pair of the incident light adjusting section 6 and the drive section 2 is provided, a plurality of pairs may also be provided as in the examples in FIG. 3, FIG. 9 and FIG. 10 of aforementioned Japanese Patent Application Laid-Open Publication No. 2010-186168. As an example, when two pairs are provided, incident light can be adjusted in three stages: incident light adjustment when the first incident light adjusting section and the second incident light adjusting section are located at the retracted position, incident light adjustment when only the first incident light adjusting section is located at the inserted position and incident light adjustment when only the second incident light adjusting section is located at the inserted position.

Moreover, in the case of a configuration in which both the first incident light adjusting section and the second incident light adjusting section are simultaneously located at the inserted position, the number of stages of incident light adjustment can be further incremented by one, that is, four-stage incident light adjustment is possible. When a plurality of pairs of the incident light adjusting section 6 and the drive section 2 are provided in this way, there is an advantage that incident light adjustment in three or more stages is possible.

Hereinafter, embodiments of the present invention will be described with reference to the accompanying drawings.

Embodiment 1

Figure 6:
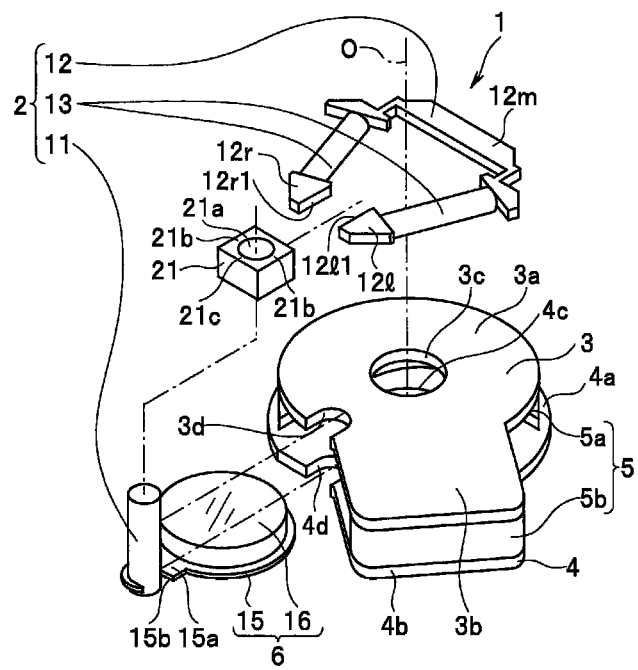
FIG. 6 is an exploded perspective view illustrating a configuration of a light adjusting apparatus according to Embodiment 1 of the present invention.
Figure 7:
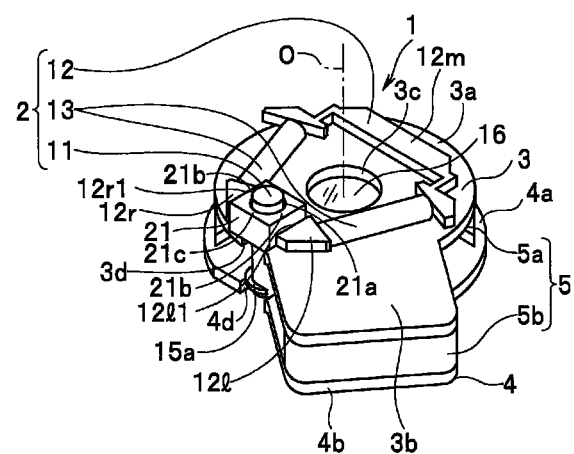
FIG. 7 is a perspective view illustrating the configuration of the light adjusting apparatus according to Embodiment 1 of the present invention.
Figure 8:
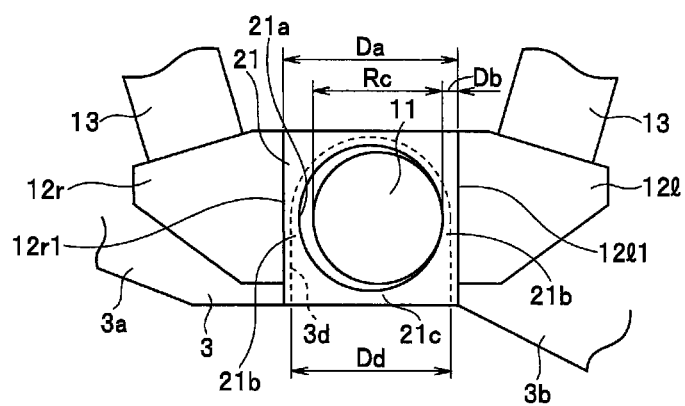
FIG. 8 is a diagram provided for describing that the distance between a core member end of a coil core member and an axial magnet according to Embodiment 1 of the present invention is within a certain range.

FIG. 6 to FIG. 8 illustrate Embodiment 1 of the present invention, FIG. 6 is an exploded perspective view illustrating a configuration of the light adjusting apparatus 1, FIG. 7 is a perspective view illustrating the configuration of the light adjusting apparatus 1 and FIG. 8 is a diagram provided for describing that the distance between the core member end of the coil core member 12 and the axial magnet 11 is within a certain range.

The light adjusting apparatus 1 of the present embodiment is constructed of the light adjusting apparatus 1 in the aforementioned basic configuration further provided with an axial magnet support member 21.

The axial magnet support member 21 of the present embodiment is made of a non-magnetic body and formed into a cylindrical shape and, to be more specific, is formed into a short quadrangular prism having an axial orifice 21*a*. Here, the axial orifice 21*a* is a circular orifice that penetrates the axial magnet support member 21 in the optical axis O direction.

On one side (top surface side shown in FIG. 6 and FIG. 7) of the first substrate 3, this axial magnet support member 21 contacts both the distal end faces 12*r*1 and 12*l*1 which are a pair of core member end faces of the coil core member 12 and is fixed using, for example, an adhesive. Note that the axial magnet support member 21 may be or may not be fixed to the first substrate 3 using an adhesive or the like. The axial magnet support member 21 is formed into a short quadrangular prism-like outside shape, but the shape is not limited to this, and may be formed into a columnar shape, for example (in this case, the distal end faces 12*r*1 and 12*l*1 of the coil core member 12 may be formed into a concave columnar surface).

Left and right side wall portions (both side wall portions) facing the distal end faces 12*r*1 and 12*l*1 of the wall portions on four sides made up of the short quadrangular prism-like outside shape and the axial orifice 21*a* are distance keeping portions 21*b* which are sandwiched between a pair of core member ends and the axial magnet 11 to keep the distance between the core member end and the axial magnet 11 on both sides of the axial magnet 11 to within a certain range. Furthermore, an end wall portion disposed at a farthest position from the opening 3*c* and coupling the left and right distance keeping portions 21*b* is a dropout prevention portion 21*c* that prevents dropout of the axial magnet 11 from the first cut-out portion 3*d* (and by extension, prevents dropout of the incident light adjusting section 6 from a structure made up of the first substrate 3, the second substrate 4 and the spacer 5).

The axial orifice 21*a* is intended to allow the axial magnet 11 to pass therethrough and pivotably support the axial magnet 11, and has an inner diameter greater than an outside diameter of the axial magnet 11 so as not to prevent the rotation of the axial magnet 11. However, in order to reduce backlash with the axial magnet 11 and bring the distance between the distal end face 12*r*1 and the axial magnet 11 closest possible to the distance between the distal end face 12*l*1 and the axial magnet 11, the axial orifice 21*a* preferably has the inner diameter close to the outside diameter of the axial magnet 11.

One of the pair of distance keeping portions 21*b* is sandwiched between the distal end face 12*r*1 and the axial magnet 11 to keep the distance between the distal end face 12*r*1 and the axial magnet 11 to within a certain range and the other distance keeping portion 21*b* is sandwiched between the distal end face 12*l*1 and the axial magnet 11 to keep the distance between the distal end face 12*l*1 and the axial magnet 11 to within a certain range. As shown in FIG. 8, if the distance between the distal end face 12*r*1 and the distal end face 12*l*1 (that is, distance between the outside faces of the pair of left and right distance keeping portions 21*b*) is Da, a minimum thickness of the distance keeping portion 21*b* is Db, and the outside diameter of the axial magnet 11 is Rc, the certain range within which a distance x between the axial magnet 11 and the distal end face 12*r*1 or the distal end face 12*l*1 is kept is as shown in following expression 1.

$$Db \leq x \leq \{Da-(Db+Rc)\} \quad \text{[Expression 1]}$$

When the outside diameter of the axial magnet 11 is substantially equal to the inner diameter of the axial orifice 21*a*, x≈Db and the distance x can thereby be kept substantially constant.

Furthermore, the dropout prevention portion 21*c* regulates a movement of the axial magnet 11 in a direction toward the open side of the U-shaped first cut-out portion 3*d* to thereby prevent dropout of the axial magnet 11 from the first cut-out portion 3*d*.

With such a configuration, during rotation, the axial magnet 11 is pivotably supported on one end side thereof in the optical axis O direction by the axial magnet support member 21 and pivotably supported on the other end side thereof in the optical axis O direction by the second cut-out portion 4*d*. That is, since the axial magnet 11 is not pivotably supported by the first cut-out portion 3*d*, as shown in FIG. 8, a diameter Dd of the first cut-out portion 3*d* is greater than a diameter (Da−2Db) of the axial orifice 21*a* and the axial orifice 21*a* is located at a position at which it is accommodated within the first cut-out portion 3*d*. Furthermore, the incident light adjusting section 6 is joined to the axial magnet 11 and since this incident light adjusting section 6 never deviates in the optical axis O direction from a predetermined distance defined by the spacer 5 between the first substrate 3 and the second substrate 4, there is no need to particularly provide a mechanism for regulating the position of the axial magnet 11 in the optical axis O direction.

Next, the light adjusting apparatus 1 is assembled in the following procedure, for example.

First, for the predetermined distance between the first substrate 3 and the second substrate 4 in the structure made up of the first substrate 3, the second substrate 4 and the spacer 5, the incident light adjusting section 6 to which the axial magnet 11 is fixed is assembled in a direction perpendicular to the optical axis O, one end side of the axial magnet 11 in the axial direction is inserted into the first cut-out portion 3*d* and the other end side thereof in the axial direction is inserted into the second cut-out portion 4*d*.

Next, the axial magnet support member 21 is brought close to the axial magnet 11 from the optical axis O direction and the axial magnet 11 is inserted into the axial orifice 21*a*.

After that, the coil core member 12 wound with the coils 13 is fixed to the top surface side of the first substrate 3 using an adhesive or the like and further the distal end faces 12r1 and 12l1 are fixed to the left and right distance keeping portions 21b of the axial magnet support member 21 using an adhesive or the like.

Note that instead of part of the above-described procedure, a procedure may also be adopted whereby after fixing the axial magnet support member 21 to the coil core member 12 wound with the coils 13, the coils 13, the coil core member 12 and the axial magnet support member 21 are fixed to the top surface of the first substrate 3 so that the axial magnet 11 is inserted into the axial orifice 21a.

According to such Embodiment 1, the distance keeping portions 21b of the axial magnet support member 21 are sandwiched between the pair of core member ends and the axial magnet 11 and the distance between the axial magnet 11 and the core member ends of the coil core member 12 can thereby be kept to within a certain range, and so it is possible to make a magnetic force acting from the distal end face 12r1 on the axial magnet 11 substantially equal to a magnetic force acting from the distal end face 12l1 on the axial magnet 11 and allow the light adjusting apparatus 1 to stably operate. In this case, since the operation becomes stable, it is also possible to improve durability.

Moreover, since the axial magnet 11 is structured to be inserted into the axial orifice 21a which is a circular orifice of the axial magnet support member 21, it is possible to support the axial magnet 11 at a certain distance throughout a whole circumferential direction, prevent the angle of inclination of the axial magnet 11 from considerably varying, and thereby further stabilize the operation.

Furthermore, since the axial magnet 11 is supported by the axial orifice 21a, the axial orifice 21a need not be supported by the first cut-out portion 3d, providing an advantage that it is not necessary to form the first cut-out portion 3d with high accuracy.

Since the axial magnet support member 21 is provided with the dropout prevention portion 21c as an integral part thereof in addition to the distance keeping portion 21b, it is possible not only to keep the above-described distance constant but also prevent dropout of the axial magnet 11 at the same time only by performing simple assembly operation of fixing the axial magnet support member 21 to the pair of core member ends. Therefore, it is not necessary to perform the operation of assembling the dropout prevention portion 21c separately from the operation of assembling the distance keeping portion 21b, and this improves operability.

In addition, since the axial magnet 11 can be inserted into the first cut-out portion 3d and the second cut-out portion 4d from a direction perpendicular to the axial direction, it is easier to assemble the incident light adjusting section 6 to the structure made up of the first substrate 3, the second substrate 4 and the spacer 5.

Furthermore, since the axial magnet support member 21 of the present embodiment has a short length in the axial direction and has a short cylindrical shape (shaped like a short quadrangular prism in which the axial orifice 21a is formed), it is possible to reduce the size and weight of the axial magnet support member 21.

Moreover, the use of the spacer 5 allows the predetermined distance between the first substrate 3 and the second substrate 4 to be reliably and easily defined.

When a plurality of pairs of the incident light adjusting section and the drive section are provided, it is possible to adjust incident light in three or more stages, providing an advantage that the adjustable range is widened.

First Modification of Embodiment 1

Figure 11:
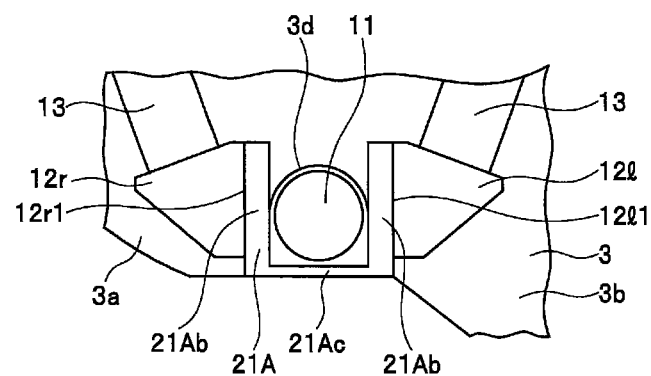
FIG. 11 is a partially enlarged plan view illustrating a configuration in the vicinity of an axial magnet support member of the light adjusting apparatus according to the first modification of Embodiment 1 of the present invention.

Next, FIG. 9 to FIG. 11 illustrate a first modification of Embodiment 1 of the present invention, FIG. 9 is a perspective view illustrating a configuration of the light adjusting apparatus 1, FIG. 10 is a plan view illustrating the configuration of the light adjusting apparatus 1 and FIG. 11 is a partially enlarged plan view illustrating a configuration in the vicinity of an axial magnet support member 21A of the light adjusting apparatus 1.

The axial magnet support member 21A of the present modification is formed of a non-magnetic body and has a configuration including three wall portions that form a U-shape when seen from the optical axis O direction, the left and right side wall portions sandwiched between the core member ends (distal end faces 12r1 and 12l1) and the axial magnet 11 constitute distance keeping portions 21Ab for keeping the distance between the core member ends and the axial magnet 11 to within a certain range and an end wall portion that connects these left and right distance keeping portions 21Ab constitutes a dropout prevention portion 21Ac for preventing dropout of the axial magnet 11 from the first cut-out portion 3d.

The axial magnet support member 21A is arranged such that the left and right distance keeping portions 21Ab are located so as to contact the distal end faces 12r1 and 12l1, and the dropout prevention portion 21Ac is located at a position farthest from the opening 3c.

After the axial magnet 11 is inserted into the first cut-out portion 3d and the second cut-out portion 4d, the axial magnet support member 21A in such a configuration is inserted in a direction perpendicular to the optical axis O so as to sandwich the circumferential surface of the axial magnet 11 from the open side of the U-shape portion and the outside faces of the distance keeping portion 21Ab are fixed to the distal end faces 12r1 and 12l1 of the coil core member 12 using an adhesive or the like.

In the above-described configuration, the axial magnet 11 can contact the dropout prevention portion 21Ac at one point (therefore, actually a line along the optical axis O direction) when seen from the optical axis O direction, and is thereby prevented from dropping out from the first cut-out portion 3d.

Note that in the above description, the dropout prevention portion 21Ac is formed into a straight line when seen from the optical axis O direction, but, for example, when the dropout prevention portion 21Ac is shaped to form two sides of a triangle when seen from the optical axis O direction, the dropout prevention portion 21Ac contacts the axial magnet 11 at two points when seen from the optical axis O direction and is thereby prevented from dropping out, and further, the dropout prevention portion 21Ac may contact the axial magnet 11 at more points to prevent dropout.

With such a configuration, during rotation, the axial magnet 11 is pivotably supported on one end side in the optical axis O direction by the axial magnet support member 21A and the first cut-out portion 3d and is pivotably supported on the other end side in the optical axis O direction by the second cut-out portion 4d.

Regarding the order of assembly into the structure made up of the first substrate 3, the second substrate 4 and the spacer 5 in the configuration of this first modification, the first to be assembled is the incident light adjusting section 6 to which the axial magnet 11 is fixed, which may be followed by either the axial magnet support member 21A or the coil core member 12 wound with the coil 13.

Such a first modification of Embodiment 1 has substantially the same effects as those of aforementioned Embodiment 1 and the axial magnet support member 21A can be attached from a direction perpendicular to the optical axis O, providing an advantage of excellent assemblability. Moreover, the dropout prevention portion 21Ac needs only to be able to contact the axial magnet 11 at least at one point when seen from the optical axis O direction and can be positioned based on the position of contact as a reference, which facilitates its positioning with respect to the axial magnet 11 and also facilitates assembly. Although certain accuracy is required for the distance between the left and right distance keeping portions 21Ab, there is an advantage that high accuracy is not required for the length within the plane perpendicular to the optical axis O in the aforementioned case of positioning with reference to the position of contact. In addition, when the dropout prevention portion 21Ac can contact the axial magnet 11 at only one point, there is another advantage that high accuracy is not required for the dropout prevention portion 21Ac either. This facilitates work on the axial magnet support member 21A and can also reduce manufacturing cost.

Second Modification of Embodiment 1

Figure 12:
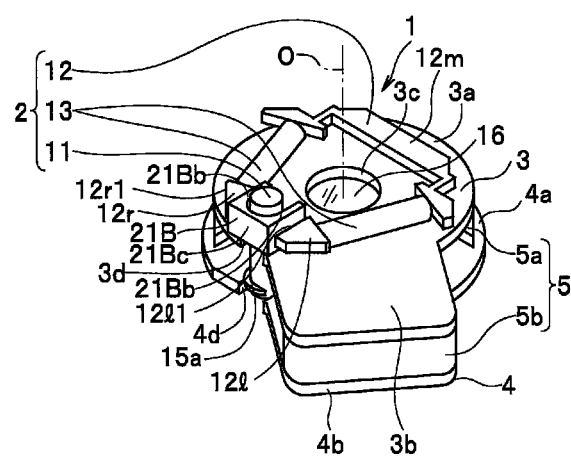
FIG. 12 is a perspective view illustrating a configuration of a light adjusting apparatus according to a second modification of Embodiment 1 of the present invention.
Figure 13:
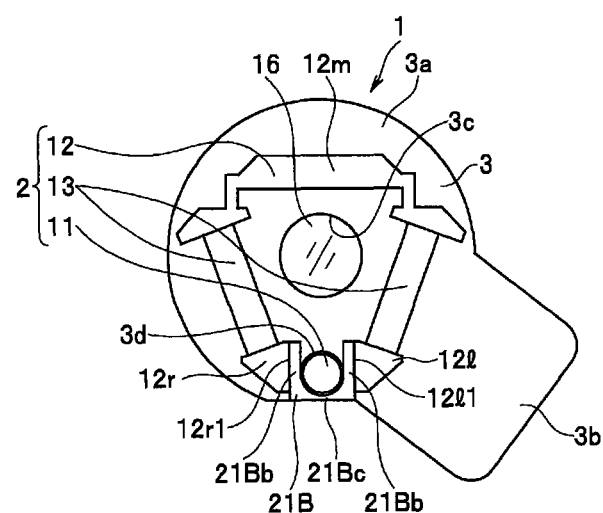
FIG. 13 is a plan view illustrating the configuration of the light adjusting apparatus according to the second modification of Embodiment 1 of the present invention.
Figure 14:
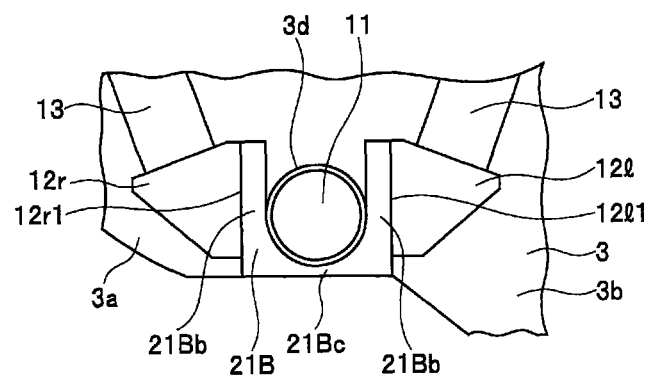
FIG. 14 is a partially enlarged plan view illustrating a configuration in the vicinity of the axial magnet support member of the light adjusting apparatus according to the second modification of Embodiment 1 of the present invention.

Next, FIG. 12 to FIG. 14 illustrate a second modification of Embodiment 1 of the present invention, FIG. 12 is a perspective view illustrating a configuration of the light adjusting apparatus 1, FIG. 13 is a plan view illustrating the configuration of the light adjusting apparatus 1, FIG. 14 is a partially enlarged plan view illustrating a configuration in the vicinity of an axial magnet support member 21B of the light adjusting apparatus 1.

The axial magnet support member 21B of the present modification is made up of a non-magnetic body and has a configuration including three U-shaped wall portions when seen from the optical axis O direction, that is, an inner surface (surface on the side facing the axial magnet 11) of a dropout prevention portion 21Bc that couples left and right distance keeping portions 21Bb is formed into a substantially semicircular columnar shape which is arcuate when seen from the optical axis O direction.

In this second modification, during rotation, the axial magnet 11 is pivotably supported on one end side thereof in the optical axis O direction by the axial magnet support member 21B and the first cut-out portion 3*d*, and pivotably supported on the other end side thereof in the optical axis O direction by the second cut-out portion 4*d*.

The second modification of Embodiment 1 has substantially the same effects as those in the aforementioned first modification of Embodiment 1 and since the inner surface of the dropout prevention portion 21Bc is formed into a substantially semicircular columnar shape, it is possible to keep the distance from the axial magnet 11 to within a certain range along a circumferential direction and stably pivotably support the axial magnet 11 and stabilize the rotation of the axial magnet 11.

Embodiment 2

Figure 15:
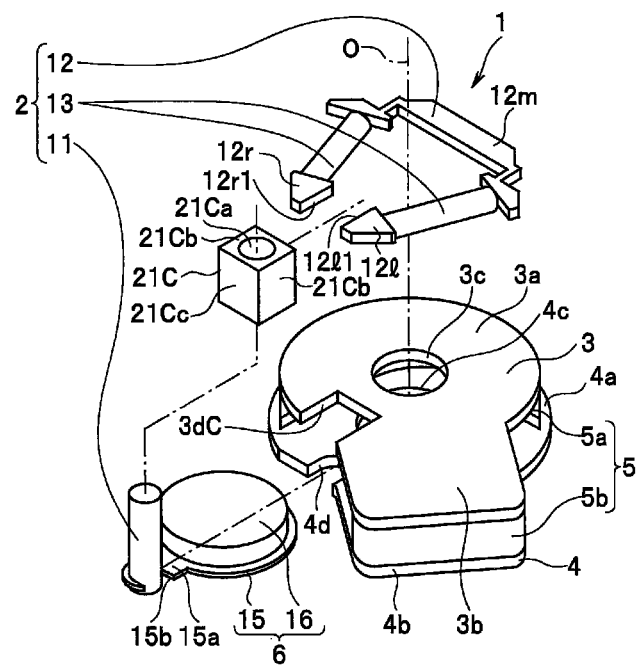
FIG. 15 is an exploded perspective view illustrating a configuration of a light adjusting apparatus according to Embodiment 2 of the present invention.
Figure 16:
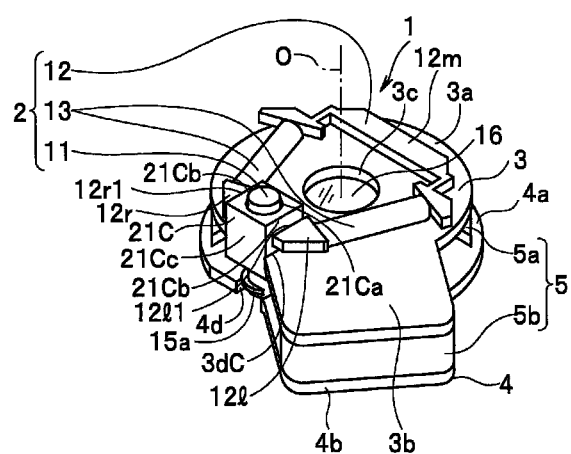
FIG. 16 is a perspective view illustrating the configuration of the light adjusting apparatus according to Embodiment 2 of the present invention.
Figure 17:
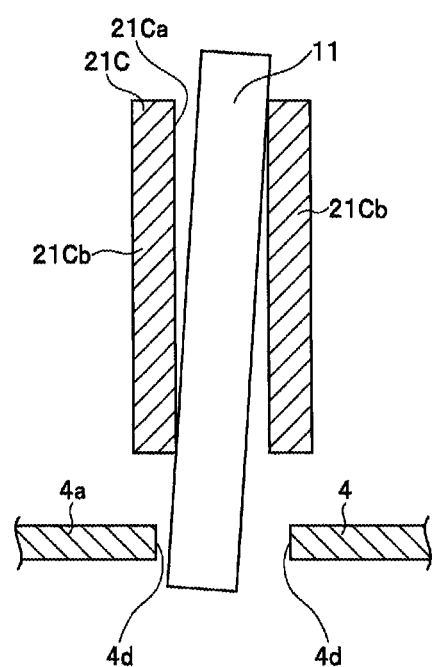
FIG. 17 is a cross-sectional view illustrating a situation in which the axial magnet is pivotably supported only by the axial magnet support member during rotation according to Embodiment 2 of the present invention.

FIG. 15 to FIG. 17 illustrate Embodiment 2 of the present invention, FIG. 15 is an exploded perspective view illustrating a configuration of a light adjusting apparatus 1, FIG. 16 is a perspective view illustrating the configuration of the light adjusting apparatus 1 and FIG. 17 is a cross-sectional view illustrating a situation in which the axial magnet 11 is pivotably supported only by an axial magnet support member 21C during rotation. In this Embodiment 2, parts similar to those in aforementioned Embodiment 1 are assigned the same reference numerals or the like and description thereof is omitted as appropriate and only differences will be mainly described.

The axial magnet support members 21, 21A and 21B of aforementioned Embodiment 1 (including modifications) are fixed to the coil core member 12 on one side of the first substrate 3. In contrast, the axial magnet support member 21C of the present embodiment is extended in length in the optical axis O direction to be located on the other side of the first substrate 3 (side on which the spacer 5 is provided).

The axial magnet support member 21C of the present embodiment is made of a non-magnetic body and formed into a cylindrical shape and is more specifically a quadrangular prism including an axial orifice 21Ca which is a circular orifice, but its length in the axial direction is greater than the length of the axial magnet support member 21 of Embodiment 1. Here, of the wall portions on the four sides made up of the quadrangular prism-like outside shape and the axial orifice 21Ca, the left and right side wall portions facing the distal end faces 12*r*1 and 12*l*1 of the coil core member 12 constitute distance keeping portions 21Cb and an end wall portion placed at a farthest position from the opening 3*c* constitutes a dropout prevention portion 21Cc as in the case of aforementioned Embodiment 1.

A first cut-out portion 3*d*C formed in the first substrate 3 is formed as a rectangular cut-out portion with which the outside surface of the axial magnet support member 21C can engage.

The axial magnet support member 21C is engaged with the first cut-out portion 3*d*C at the midpoint in the axial direction, fixed using an adhesive or the like and extended to the other side of the first substrate 3. Note that the distance keeping portions 21Cb of the axial magnet support member 21C are fixed to the distal end faces 12*r*1 and 12*l*1 of the coil core member 12 using an adhesive or the like in the same way as in the aforementioned embodiment.

Therefore, the axial magnet support member 21C is not only fixed to the distal end faces 12*r*1 and 12*l*1 of the coil core member 12 on the top end side of the left and right distance keeping portions 21Cb but also supported by the first substrate 3 at the midpoint.

FIG. 17 illustrates a situation in which the axial magnet 11 is pivotably supported by only the axial magnet support member 21C during rotation with such a configuration.

Such Embodiment 2 has substantially the same effects as those of aforementioned Embodiment 1, and since the axial magnet support member 21C is configured to extend from one side to the other side of the first substrate 3, the axial orifice 21Ca is extended in length in the optical axis O direction such that the axial magnet 11 is pivotably supported by only the axial magnet support member 21C during rotation, the axial magnet 11 is pivotably supported only by the single axial orifice 21Ca which is a single member, and the axial magnet 11 can be pivotably supported with higher accuracy compared to Embodiment 1 in which the axial magnet 11 is pivotably supported by a plurality of structures made up of a plurality of members. There is also an advantage that high accuracy alignment between the axial magnet support member 21C and, for example, the second cut-out portion 4*d* is also unnecessary. As a result, inclination of the axial magnet 11 is effectively suppressed and a more stable operation can be achieved.

Embodiment 3

Figure 18:
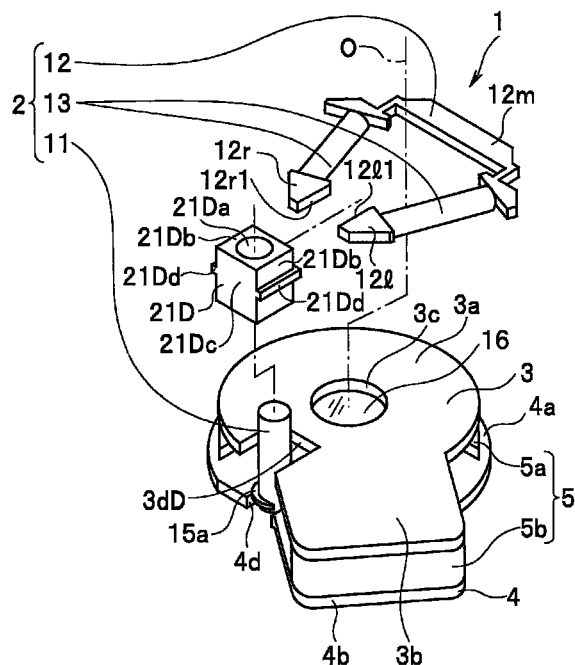
FIG. 18 an exploded perspective view illustrating a configuration of a light adjusting apparatus according to Embodiment 3 of the present invention.
Figure 19:
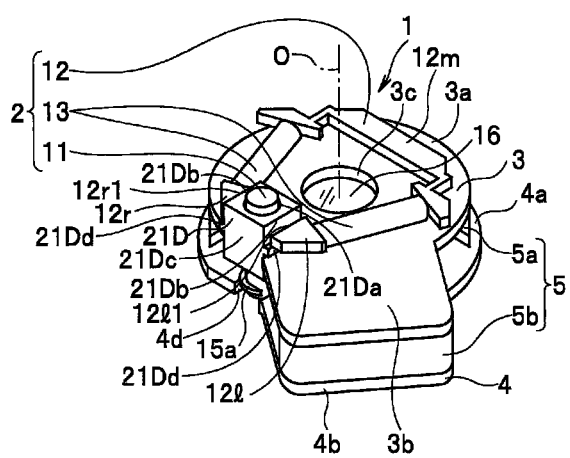
FIG. 19 is a perspective view illustrating the configuration of the light adjusting apparatus according to Embodiment 3 of the present invention.
Figure 20:
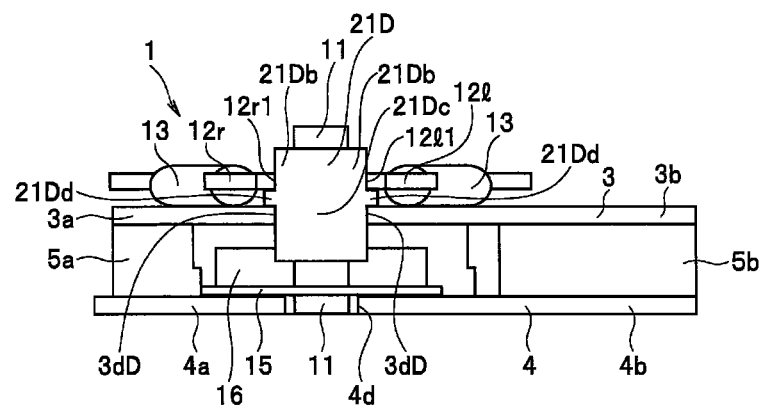
FIG. 20 is a side view illustrating the configuration of the light adjusting apparatus according to Embodiment 3 of the present invention.

FIG. 18 to FIG. 20 illustrate Embodiment 3 of the present invention, FIG. 18 is an exploded perspective view illustrating a configuration of the light adjusting apparatus 1, FIG. 19 is a perspective view illustrating the configuration of the light adjusting apparatus 1 and FIG. 20 is a side view illustrating the configuration of the light adjusting apparatus 1. In Embodiment 3, parts similar to those in aforementioned Embodiments 1 and 2 are assigned the same reference numerals or the like and description thereof is omitted as appropriate and only differences will be mainly described.

An axial magnet support member 21D of the present embodiment is further provided with side flanges 21Dd which are positioning portions to define the position in the axial direction.

That is, the axial magnet support member 21D is made of a non-magnetic body and formed into a cylindrical shape as in the case of the axial magnet support member 21C of aforementioned Embodiment 2, more specifically, forming a quadrangular prism having an axial orifice 21Da which is a circular orifice, which, however, is longer in the axial direction than the axial magnet support member 21 of Embodiment 1.

Of the wall portions on four sides made up of the quadrangular prism-like outside shape and the axial orifice 21Da, the left and right side wall portions facing the distal end faces 12r1 and 12l1 of the coil core member 12 constitute distance keeping portions 21Db and the end wall portion located at a position farthest from the opening 3c constitutes a dropout prevention portion 21Dc in the same way as in aforementioned Embodiments 1 and 2.

The side flanges 21Dd are provided so as to protrude at left and right from at a midpoint in the axial direction on the outside surfaces of the left and right distance keeping portions 21Db of the axial magnet support member 21D, intended to determine the position of the axial magnet support member 21D in the optical axis O direction and determine the position of the axial orifice 21Da so as to be parallel to the optical axis O direction.

A first cut-out portion 3dD formed in the first substrate 3 is formed as a rectangular cut-out portion into which the outside surface of the axial magnet support member 21D can be easily inserted (that is, configured so as to include a certain gap with respect to the outside surface of the axial magnet support member 21D). That is, in the present embodiment, the side flanges 21Dd are formed which allow alignment with the first substrate 3, and the first cut-out portion 3dD thereby need not have a shape for engaging with the outside surface of the axial magnet support member 21D unlike aforementioned Embodiment 2 (however, may also have an engaging shape).

With such a configuration, the axial magnet support member 21D is inserted into the first cut-out portion 3dD of the first substrate 3, the side flanges 21Dd come into contact with one side (top surface side in FIG. 18 to FIG. 20) of the first substrate 3 and are fixed using an adhesive or the like (it should be noted that the side flanges 21Dd are not arranged on the undersurface side of the first substrate 3 so that the incident light adjusting section 6 does not come into contact with the side flanges 21Dd when it rotates (or so as not to narrow the rotation range of the incident light adjusting section 6)).

The distance keeping portions 21Db of the axial magnet support member 21D are fixed to the distal end faces 12r1 and 12l1 of the coil core member 12 using an adhesive or the like in the same way as in the aforementioned embodiments.

The axial magnet 11 is also pivotably supported only by the axial magnet support member 21D at the time of rotation in Embodiment 3 in the same way as in aforementioned Embodiment 2 and the condition thereof is also similar to that in aforementioned Embodiment 2.

Such Embodiment 3 has substantially the same effects as those of aforementioned Embodiment 2 and since the axial magnet support member 21D is provided with the side flanges 21Dd, it is possible to easily determine the position of the axial magnet support member 21D in the optical axis O direction with respect to the first substrate 3 through a simple operation of causing the side flanges 21Dd to come into contact with the first substrate 3 and perform alignment so that the axial orifice 21Da becomes parallel to the optical axis O direction.

Furthermore, since the first cut-out portion 3dD has a shape including some gap with respect to the outside surface of the axial magnet support member 21D, the operation of inserting the axial magnet support member 21D into the first cut-out portion 3dD becomes easier. Moreover, there is an advantage that the first cut-out portion 3dD need not be formed with high accuracy.

Thus, it is possible to realize high accuracy alignment along with easy assembly.

Embodiment 4

Figure 21:
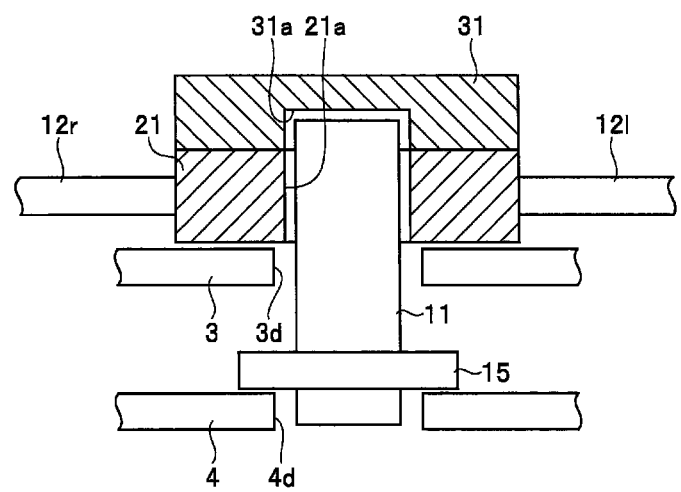
FIG. 21 is a partially enlarged side view including a partial cross section illustrating a configuration of supporting an axial magnet according to Embodiment 4 of the present invention.

FIG. 21 illustrates Embodiment 4 of the present invention and is a partially enlarged side view including a partial cross section illustrating a configuration supporting the axial magnet 11.

In this Embodiment 4, parts similar to those in aforementioned Embodiments 1 to 3 are assigned the same reference numerals or the like and description thereof is omitted as appropriate, and only differences will be mainly described.

In the present embodiment, a distance keeping member 31 is added on the top of the axial magnet support member 21 to regulate the movement in the axial direction of the axial magnet 11 (and, by extension, the incident light adjusting section 6) so that the distance between the incident light adjusting section 6 (the lens frame 15 and the lens 16 or the like in the present embodiment) and the first substrate 3 is kept to a predetermined distance or more. Here, the "predetermined distance" refers to such a distance that the incident light adjusting section 6 does not contact the first substrate 3, and is such a distance that the surface of the lens 16 does not contact the first substrate 3 in the present embodiment.

In the configuration of the present embodiment, the movement of the axial magnet 11 in a direction in which the incident light adjusting section 6 comes close to the second substrate 4 is already regulated by the lens frame 15 contacting the second substrate 4. Therefore, the distance keeping member 31 according to the present embodiment is intended to regulate the movement of the axial magnet 11 in a direction in which the incident light adjusting section 6 comes close to the first substrate 3.

That is, the distance keeping member 31 is shaped and arranged so as to cover the top surface side of the axial magnet support member 21 (the side of the axial magnet support member 21 opposite to the incident light adjusting section 6) and is provided with a bottomed axial hole 31a with which the top end portion of the axial magnet 11 engages at a position of the axial magnet support member 21 corresponding to the axial orifice 21a. The distance keeping member 31 is fixed to the top surface of the axial magnet support member 21 on the undersurface side except the axial hole 31a using an adhesive, for example.

Such Embodiment 4 has substantially the same effects as those of aforementioned Embodiments 1 to 3, and can not only regulate, through the axial magnet support member 21, the movement of the axial magnet 11 in the diameter direction but also regulate, through the distance keeping member 31, the movement of the axial magnet 11 in the axial direction.

By regulating the movement of the axial magnet 11 (and, by extension, the incident light adjusting section 6) in the axial direction, it is possible to keep the distance between the incident light adjusting section 6 joined to the axial magnet 11 (the lens frame 15 and the lens 16 or the like in the present embodiment) and the first substrate 3 to a predetermined distance or more. For this reason, even when the surface of the lens 16 protrudes above the top surface of the lens frame 15 as a result of slimming down the lens frame 15, the surface of the lens 16 will never contact the first substrate 3, and it is possible to prevent the surface of the lens 16 from being damaged. Moreover, since the lens 16 never contacts the first substrate 3, it is possible to reduce friction when the incident light adjusting section 6 rotates integrally with the axial magnet 11 and perform a rotation operation stably with low torque.

First Modification of Embodiment 4

Figure 22:
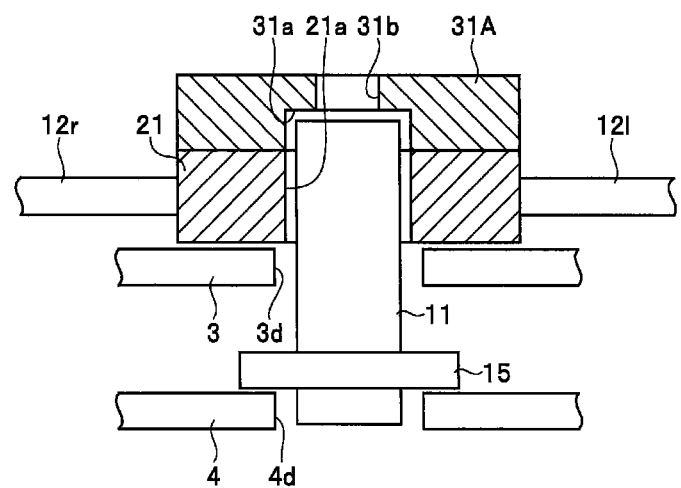
FIG. 22 is a partially enlarged side view including a partial cross section illustrating a configuration of supporting an axial magnet according to a first modification of Embodiment 4 of the present invention.

FIG. 22 illustrates a first modification of Embodiment 4 of the present invention and is a partially enlarged side view including a partial cross section illustrating a configuration of supporting the axial magnet 11.

A distance keeping member 31A of the present modification further includes an orifice 31b provided in the axial hole 31a.

That is, the distance keeping member 31A includes the orifice 31b in the axial direction having a size that the axial magnet 11 does not penetrate, formed at the hole bottom of the axial hole 31a so as to be coaxial with the axial magnet 11. When formed as a circular orifice, for example, this orifice 31b has a diameter smaller than the diameter of the axial magnet 11 (however, the orifice 31b is not limited to the circular hole, but it may be any shape in size that prevents the axial magnet 11 from penetrating).

Such a configuration can reduce the area of contact between the axial hole 31a and the axial magnet 11 while maintaining the function of the bottom surface of the axial hole 31a regulating the movement of the axial magnet 11 in the axial direction.

The first modification of Embodiment 4 has substantially the same effects of those of aforementioned Embodiment 4, and can reduce the area of contact between the distance keeping member 31A and the axial magnet 11, reduce friction when the axial magnet 11 rotates and perform a rotation operation stably with much lower torque.

Note that the configuration of reducing friction between the axial magnet 11 and the distance keeping member 31A is not limited to the configuration of forming the aforementioned orifice 31b, but another configuration can also be adopted.

Substantially the same effects as those described above can be achieved by providing, for example, a configuration of reducing friction (e.g., friction reducing coating or bead-like member or bearing ball) on the surface of the distance keeping member 31A with which the axial magnet 11 comes into contact.

Furthermore, by configuring the first cut-out portion 3d and the second cut-out portion 4d as larger cut-out portions or stopping the provision of such portions per se, it is possible to prevent the axial magnet 11 from contacting the first substrate 3 and the second substrate 4 (that is, by regulating the movement of the axial magnet 11 in the diameter direction using only the axial magnet support member 21 and the distance keeping member 31A) and prevent the holding portion 15a with which the axial magnet 11 engages from contacting the second substrate 4, thereby further reduce friction and perform the rotation operation more stably with lower torque.

Second Modification of Embodiment 4

Figure 23:
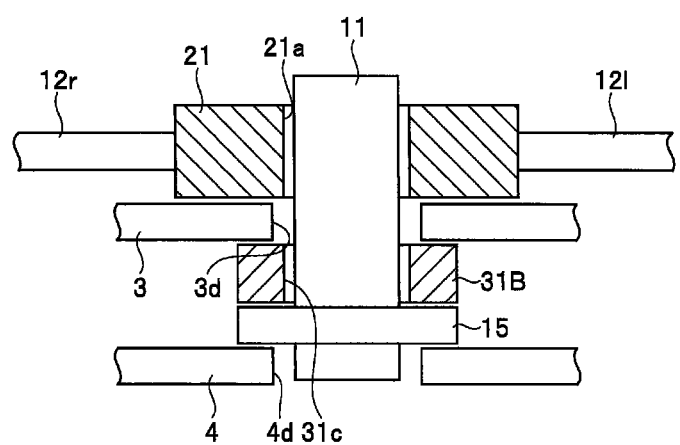
FIG. 23 is a partially enlarged side view including a partial cross section illustrating a configuration of supporting an axial magnet according to a second modification of Embodiment 4 of the present invention.
Figure 24:
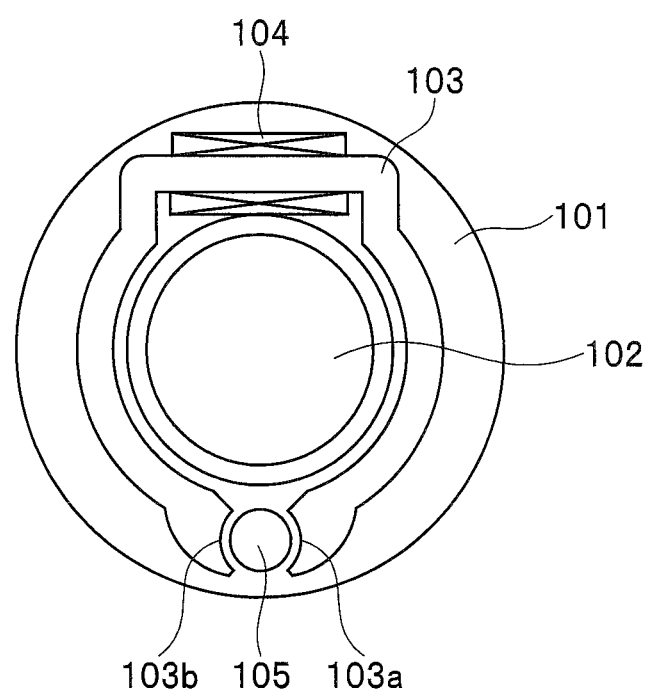
FIG. 24 is a plan view illustrating an example of a configuration of a conventional light adjusting apparatus.

FIG. 23 illustrates a second modification of Embodiment 4 of the present invention and is a partially enlarged side view including a partial cross section illustrating a configuration of supporting the axial magnet 11.

The present modification shows an example where a distance keeping member 31B is provided between the first substrate 3 and the lens frame 15.

That is, the distance keeping member 31B is configured as a ring-shaped spacer provided with an axial orifice 31c and disposed sandwiched between the undersurface side of the first substrate 3 and the top surface side of the lens frame 15 (that is, part of the incident light adjusting section 6). Here, a height of the distance keeping member 31B in an axial direction is such a height that the incident light adjusting section 6 does not contact the first substrate 3, and in the example of the present embodiment, is such a height that the surface of the lens 16 does not contact the first substrate 3. Therefore, the distance keeping member 31B of the present embodiment does not regulate the movement in the axial direction of the incident light adjusting section 6 via the axial magnet 11 but directly regulates the movement in the axial direction of the lens frame 15 included in the incident light adjusting section 6.

The axial magnet 11 is inserted into the axial orifice 21a of the axial magnet support member 21 via the axial orifice 31c.

Note that the distance keeping member 31B may not be fixed and may be loosely fitted to the axial magnet 11 if it is only intended to regulate the movement in the axial direction of the incident light adjusting section 6. In contrast, when the distance keeping member 31B is fixed, for example, to the undersurface of the first substrate 3 using an adhesive or the like, the distance keeping member 31B can also function as a part of regulating the movement in the diameter direction of the axial magnet 11 as in the case of the axial magnet support member 21.

The second modification of Embodiment 4 has substantially the same effects as those of aforementioned Embodiment 4 and the first modification of Embodiment 4, and also prevents the distance keeping member 31B from protruding above the axial magnet support member 21, and thereby provides an advantage that the height of the light adjusting apparatus 1 in the axial direction does not increase.

Note that if the axial magnet support member 21C shown in FIG. 17 of aforementioned Embodiment 2 is designed such that the lens frame 15 is interposed between the bottom end of the axial magnet support member 21C and the top surface of the second substrate 4, it is possible to keep the distance between the lens 16 and the first substrate 3 to a predetermined distance or more, and can thereby perform the same function as the distance keeping member 31B.

Note that the present invention is not limited to the aforementioned embodiments as they are, but can be implemented by modifying the components thereof without departing from the spirit and scope of the invention in an implementation phase thereof. Furthermore, various aspects of the invention can be formed by appropriately combining the plurality of components disclosed in the foregoing embodiments. For example, some components may be deleted from all the components shown in the embodiments. Moreover, the components among different embodiments may be combined as appropriate. Thus, it goes without saying that various modifications and applications can be made without departing from the spirit and scope of the present invention.

What is claimed is:

1. A light adjusting apparatus comprising:
a drive section comprising an axial magnet magnetized so as to have different magnetic poles around an axis, a coil core member located in proximity to a side face of the axial magnet at a core member end and a coil wound around the coil core member, the drive section rotating the axial magnet by transmitting a magnetic force generated by passing a current through the coil to the axial magnet via the coil core member;
a first substrate comprising a first light passage shaped portion for allowing incident light to pass therethrough and a first cut-out portion into which one end side of the axial magnet in an axial direction is inserted, on one side of which the coil and the coil core member are arranged;
a second substrate disposed parallel to the first substrate at a predetermined distance so as to face the other side of the first substrate comprising a second light passage shaped portion for allowing incident light to pass therethrough and a second cut-out portion for inserting the other end side of the axial magnet in the axial direction;
an incident light adjusting section to which the axial magnet is joined so as to rotate integrally therewith, disposed so as to rotate within the predetermined distance along with rotation of the axial magnet, and having a function of adjusting light; and
an axial magnet support member comprising a distance keeping portion fixed to the core member end, sandwiched between the core member end and the axial magnet to keep a distance between the core member end and the axial magnet to within a certain range and a dropout prevention portion for preventing dropout of the axial magnet from the first cut-out portion,
wherein the incident light adjusting section is rotated by the drive section via the axial magnet to be displaced to a retracted position retracted from an optical path of the incident light that passes through the first light passage shaped portion and the second light passage shaped portion, and to an inserted position located in the optical path of the incident light to thereby adjust the incident light,
the coil core member is formed in an open curved shape, the coil core member having a pair of core member ends that sandwiches both sides of the axial magnet, and the coil core member and the axial magnet together form a closed magnetic circuit,
the axial magnet support member is fixed to both of the pair of core member ends, and the distance keeping portion is sandwiched between the pair of core member ends and the axial magnet to keep the distance between both sides of the axial magnet and the pair of core member ends to within a certain range, and
the axial magnet support member has a cylindrical shape including an axial orifice parallel to the axial direction to insert the axial magnet therethrough, a cylindrical portion facing the pair of core member ends in the cylindrical shape is the distance keeping portion and a cylindrical portion opposite to the first light passage shaped portion in the cylindrical shape is the dropout prevention portion.

2. The light adjusting apparatus according to claim 1, wherein the axial magnet support member has a length in the axial direction such that it is disposed on the one side of the first cut-out portion on the first substrate.

3. The light adjusting apparatus according to claim 1, wherein
the first cut-out portion is formed into a shape that allows the cylindrical outside surface of the axial magnet support member to be inserted therein,
the axial magnet support member is extended from the one side to the other side of the first substrate via the first cut-out portion, and
the axial magnet is pivotably supported by the axial magnet support member during rotation.

4. The light adjusting apparatus according to claim 3, wherein the axial magnet support member further comprises a positioning portion that is fixed in contact with the one side of the first substrate to position the axial orifice so as to be parallel to the axial direction.

5. The light adjusting apparatus according to claim 1, further comprising a spacer that is sandwiched between the first substrate and the second substrate to define the predetermined distance.

6. The light adjusting apparatus according to claim 1, further comprising a distance keeping member that regulates a movement in the axial direction of the incident light adjusting section to thereby keep the distance between the incident light adjusting section and the first substrate to a predetermined distance or more.

7. The light adjusting apparatus according to claim 6, wherein the distance keeping member is disposed so as to cover the opposite side of the incident light adjusting section of the axial magnet support member, and regulates a movement in the axial direction of the axial magnet to thereby keep the distance between the incident light adjusting section and the first substrate to a predetermined distance or more.

8. The light adjusting apparatus according to claim 6, wherein the distance keeping member is disposed sandwiched between the first substrate and the incident light adjusting section to keep the distance between the incident light adjusting section and the first substrate to a predetermined distance or more.

9. The light adjusting apparatus according to claim 1, wherein the axial magnet is pivotably supported on one end side in the axial direction by the axial magnet support member and the first cut-out portion during rotation and pivotably supported on the other end side in the axial direction by the second cut-out portion.

* * * * *